(12) United States Patent
Chandrasekhar

(10) Patent No.: US 9,995,949 B2
(45) Date of Patent: Jun. 12, 2018

(54) METHOD AND APPARATUS FOR CONTROL OF ELECTROCHROMIC DEVICES

(71) Applicant: ASHWIN-USHAS CORPORATION, INC., Holmdel, NJ (US)

(72) Inventor: Prasanna Chandrasekhar, Holmdel, NJ (US)

(73) Assignee: Ashwin-Ushas Corporation, Inc., Holmdel, NJ (US)

( * ) Notice: Subject to any disclaimer, the term of this patent is extended or adjusted under 35 U.S.C. 154(b) by 0 days. days.

(21) Appl. No.: 15/160,716

(22) Filed: May 20, 2016

(65) Prior Publication Data

US 2016/0266410 A1 Sep. 15, 2016

Related U.S. Application Data

(63) Continuation of application No. PCT/US2014/065170, filed on Nov. 12, 2014, which is a continuation of application No. 14/084,684, filed on Nov. 20, 2013, now Pat. No. 8,902,486.

(51) Int. Cl.
| | |
|---|---|
| *G02C 7/10* | (2006.01) |
| *G02F 1/163* | (2006.01) |
| *G02F 1/133* | (2006.01) |
| *G02F 1/15* | (2006.01) |

(52) U.S. Cl.
CPC ......... *G02C 7/101* (2013.01); *G02F 1/13318* (2013.01); *G02F 1/163* (2013.01); *G02F 2001/1515* (2013.01); *G02F 2001/1519* (2013.01)

(58) Field of Classification Search
CPC ...... G02F 1/163; G02F 1/13318; G02F 1/153; G02F 1/15; G02F 1/1523; G02F 1/155; G02F 1/157; G02F 1/161; G02F 1/1506; G02F 1/1521; G02F 1/1525; G02F 1/1533; G02C 7/101; G02C 7/12; C09K 9/02; B01J 19/087; B29D 11/00634; B29D 11/0073; G02B 5/23; G02B 5/3058; G02B 27/017; G02B 27/0172; G02B 27/2221; G02B 27/2264; B32B 17/10036; B32B 17/10174

USPC ................ 351/49, 41–45, 153, 158; 349/14; 204/165; 359/265, 238, 239, 267, 359/270–275, 295, 464, 513, 603, 604; 256/60; 427/58, 126.4, 523

See application file for complete search history.

(56) References Cited

U.S. PATENT DOCUMENTS

| | | |
|---|---|---|
| 3,807,832 A | 4/1974 | Castellion |
| 3,844,636 A | 10/1974 | Maricle |
| 4,215,917 A | 8/1980 | Giglia |
| 4,272,163 A | 6/1981 | Samokhin |
| 4,304,465 A | 12/1981 | Diaz |

(Continued)

OTHER PUBLICATIONS

Li, et al., "Variable emissivity infrared electrochrome device based on polyaniline conducting polymer", Synthetic Metals, vol. 159, pp. 1386-1388 (2009).

(Continued)

*Primary Examiner* — Mustak Choudhury
(74) *Attorney, Agent, or Firm* — Morgan Lewis & Bockius LLP

(57) ABSTRACT

The present invention provides apparatuses and methods for modulating the transmissivity of electrochromic devices utilizing a controller that provides a continuous potential that may be pulsed to the electrochromic device.

7 Claims, 11 Drawing Sheets

(56) References Cited

U.S. PATENT DOCUMENTS

| | | |
|---|---|---|
| 4,586,792 A | 5/1986 | Yang |
| 4,618,218 A | 10/1986 | Shaw |
| 4,749,260 A | 6/1988 | Yang |
| 4,874,481 A | 10/1989 | Suzuki |
| 4,902,108 A | 2/1990 | Byker |
| 4,939,043 A | 7/1990 | Biricik |
| 5,079,334 A | 1/1992 | Epstein |
| 5,095,153 A | 3/1992 | Agnes |
| 5,124,080 A | 6/1992 | Shabrang |
| 5,137,991 A | 8/1992 | Epstein |
| 5,159,031 A | 10/1992 | Epstein |
| 5,164,465 A | 11/1992 | Epstein |
| 5,173,443 A | 12/1992 | Biricik |
| 5,241,411 A | 8/1993 | Arribait |
| 5,253,100 A | 10/1993 | Yang |
| 5,373,305 A | 12/1994 | Lepore, Jr. |
| 5,373,306 A | 12/1994 | Amore |
| 5,413,739 A | 5/1995 | Coleman |
| 5,446,576 A | 8/1995 | Lynam |
| 5,446,577 A | 8/1995 | Bennett |
| 5,500,759 A | 3/1996 | Coleman |
| 5,561,206 A | 10/1996 | Yamamoto |
| 5,864,419 A | 1/1999 | Lynam |
| 5,995,273 A | 11/1999 | Chandrasekhar |
| 6,033,592 A | 3/2000 | Chandrasekhar |
| 6,089,721 A | 7/2000 | Schierbeek |
| 6,189,835 B1 | 2/2001 | Kaufman |
| 6,279,857 B1 | 8/2001 | Roth |
| 6,327,069 B1 | 12/2001 | Allemand et al. |
| 6,409,903 B1 | 6/2002 | Chung |
| 6,538,796 B1 | 3/2003 | Swanson |
| 6,713,774 B2 | 3/2004 | DeSteese |
| 6,859,297 B2 | 2/2005 | Lee |
| 7,180,649 B2 | 2/2007 | Morrison et al. |
| 7,219,860 B2 | 5/2007 | Wehner |
| 7,270,891 B2 | 9/2007 | Roth |
| 7,277,215 B2 | 10/2007 | Greer |
| 7,333,258 B2 | 2/2008 | Yang |
| 7,342,708 B2 | 3/2008 | Ho |
| 7,355,161 B2 | 4/2008 | Romig |
| 7,390,123 B2 | 6/2008 | Friedman |
| 7,675,667 B2 | 3/2010 | Xu |
| 7,691,284 B2 | 4/2010 | Cumberland |
| 7,733,335 B2 | 6/2010 | Zehner |
| 7,738,155 B2 | 6/2010 | Agrawal et al. |
| 7,761,053 B2 | 7/2010 | Kruzelecky |
| 7,874,666 B2 | 1/2011 | Xu |
| 7,951,902 B2 | 5/2011 | Sotzing |
| 7,952,557 B2 | 5/2011 | Amundson |
| 7,999,992 B2 | 8/2011 | Mazurkiewicz |
| 8,017,217 B1 | 9/2011 | Gregoire |
| 8,018,644 B2 | 9/2011 | Gustavsson |
| 8,234,507 B2 | 7/2012 | Zhu |
| 2002/0191270 A1 | 12/2002 | Lu et al. |
| 2003/0202249 A1 | 10/2003 | Schierbeek |
| 2003/0214695 A1 | 11/2003 | Abramson |
| 2007/0008603 A1 | 1/2007 | Sotzing et al. |
| 2007/0103761 A1 | 5/2007 | Giron et al. |
| 2008/0131773 A1 | 6/2008 | Lucas et al. |
| 2009/0073558 A1* | 3/2009 | Jacobs .................. G02B 27/017 359/464 |
| 2009/0096745 A1 | 4/2009 | Sprague |
| 2009/0203873 A1 | 8/2009 | Sotzing |
| 2010/0280561 A1 | 11/2010 | Song |
| 2010/0283957 A1* | 11/2010 | Matera ............. B29D 11/00634 351/49 |
| 2011/0111147 A1 | 5/2011 | Agrawal |
| 2011/0135837 A1 | 6/2011 | Burdis et al. |
| 2011/0151317 A1 | 6/2011 | Giroud |
| 2011/0187684 A1 | 8/2011 | Amundson |
| 2011/0255142 A1 | 10/2011 | Ash |
| 2012/0235900 A1 | 9/2012 | Border |
| 2013/0120821 A1 | 5/2013 | Chandrasekhar |
| 2013/0235323 A1* | 9/2013 | Sotzing .................... C09K 9/02 351/44 |
| 2013/0271814 A1 | 10/2013 | Brown |
| 2013/0293825 A1* | 11/2013 | Trajkovska ............. G02F 1/153 351/44 |

OTHER PUBLICATIONS

International Search Report for PCT/US2013/032320 dated Feb. 3, 2014.

Written Opinion for PCT/US2013/032320 dated Feb. 3, 2014.

Supplementary European Search Report for EP14863463 dated Apr. 21, 2017.

* cited by examiner

A1 = BioAnalytical Systems (BAS) Potentiostat
A2 = Princeton Applied Research (PARC) Potentiostat
A,B,C = Controller with Program A, B or C
*(Switching time measured as 10-90 %T transition @ 575 nm)*

| Device ID | Algorithm | Switch Time (sec) | | %T @ 575nm | | %T @ 575nm |
|---|---|---|---|---|---|---|
| | | L to D | D to L | L | D | D %T |
| | | | | | | |
| S1A104AD | A1 | 4.7 | 2.9 | 58.44 | 8.67 | 49.77 |
| | A2 | 11.3 | 12.7 | 57.43 | 9.17 | 48.26 |
| | A | 3.1 | 2.0 | 57.57 | 8.67 | 48.90 |
| | B | 2.5 | 1.6 | 57.81 | 8.67 | 49.14 |
| | | L to D | D to L | L | D | D %T |
| | | | | | | |
| S1A104BD | A2 | 7.8 | 11.0 | 56.93 | 7.29 | 49.64 |
| | A | 2.3 | 1.8 | 56.80 | 7.29 | 49.51 |
| | C | 1.8 | 1.6 | 56.93 | 7.29 | 49.64 |
| | | L to D | D to L | L | D | D %T |
| | | | | | | |
| S1A104CD | A | 5.7 | 4.0 | 53.16 | 5.03 | 48.13 |
| | B | 5.1 | 3.2 | 53.16 | 4.90 | 48.26 |
| | C | 4.2 | 3.2 | 53.00 | 4.88 | 48.12 |
| | | L to D | D to L | L | D | D %T |
| | | | | | | |
| S1A104CD | A | 7.8 | 4.3 | 53.03 | 5.57 | 47.46 |
| | C | 6.4 | 3.0 | 52.78 | 5.28 | 47.50 |
| | B | 6.3 | 3.1 | 52.66 | 5.28 | 47.38 |
| | | L to D | D to L | L | D | D %T |
| | | | | | | |
| S1A104BD | A | 4.9 | 2.3 | 57.68 | 7.54 | 50.14 |
| | C | 4.3 | 1.6 | 57.81 | 7.54 | 50.27 |
| | B | 4.1 | 1.9 | 57.81 | 7.54 | 50.27 |

FIGURE 10

METHOD AND APPARATUS FOR CONTROL OF ELECTROCHROMIC DEVICES

CROSS-REFERENCE TO RELATED APPLICATIONS

This application is a continuation of International Patent Application No. PCT/US14/65170, filed Nov. 12, 2014, which claims the benefit of U.S. Non-Provisional application Ser. No. 14/084,684, filed Nov. 20, 2013, which issued as U.S. Pat. No. 8,902,486, on Dec. 2, 2014, the entirety of which are incorporated herein by reference.

FIELD OF THE INVENTION

The present invention relates generally to devices and methods for modulating electrochromic devices and more particularly but not exclusively to devices and methods for controlling the transmissivity of electrochromic devices by delivering a continuous voltage that is pulsed, which allows for rapid switching between transmissive and non-transmissive states of such electrochromic devices.

BACKGROUND OF THE INVENTION

Certain electrochromic materials may change color when applying a voltage. The color change may be in the visible spectrum, but can also be, for example, in the near infrared (NIR), infrared (IR), or microwave spectral region. The change in color of an electrochromic material is usually due to reduction/oxidation ("redox") processes within the electrochromic materials. Further, electrochromic devices may be switched between a substantially transmissive state and a substantially non-transmissive state depending upon the applied voltage. Indeed, electrochromic devices may be in a transmissive mode, in which light passes through the device and also modified by the device, and/or a reflective mode, in which light is reflected off the device and also modified by the device. Electrochromic devices composed of such materials may be developed wherein their transmissive properties may be adjusted or controlled.

To control electrochromic devices (in any region—Visible, IR or other), a small DC voltage may be applied. Such devices may utilize conducting polymers (CPs), inorganic metal oxides (MOs), or liquid crystals (LCs), for example. The DC voltage applied is generally <(+/−) 50 V in the case of LCs, <(+/−) 5 V in the case of MOs, and <(+/−) 3 V in the case of CPs.

In certain electrochromic devices, the voltage applied to the electrochromic device should generally not exceed certain maximum voltages. When the maximum applied voltage is exceeded (in which case an "overvoltage" or "overpotential" is said to be applied), irreversible oxidative or reductive degradation may occur, with consequent damage and cessation of function of the device. In the case of CP and MO devices, the redox stability limits for applied voltage are generally determined from the cyclic voltammogram (CV) of the system.

In evaluating the operability of such electrochromic devices, switching times are related to the applied voltage where increased voltage may, for example, cause the device to switch fast. However, the trade off is degradation of the device. Therefore, there exists a need in the field for devices and methods that allow for improved electrochromic switching, especially in devices comprising CPs, that do not degrade or destroy the electrochromic device

SUMMARY OF THE INVENTION

The invention sets forth devices and methods for applying electrical potential to electrochromic devices in order to electrochromically switch such devices and/or, preferably, deliver a continuous voltage that is pulsed in order to achieve a selected transmittance state of the electrochromic device.

In one aspect, the invention provides a method for modulating the transmittance of an electrochromic device having a first electrode, a second electrode, and a power source in electrical communication with the first and second electrodes, with the method comprising the step of delivering a continuous voltage from the power source across the first and second electrodes and pulsing the continuous voltage according to a pulse sequence. The pulse sequence may comprise applying at least one overpotential for less than about 0.5 seconds and then applying an operating potential for less than about 0.5 seconds. The overpotential is greater in magnitude than the operating potential. The method includes the step of halting delivery of the continuous voltage to the first and second electrode once a selected transmittance state of the electrochromic device is reached.

Additionally, other embodiments of the step of delivering a continuous voltage from the power source may include controlling the pulse sequence with a controller operably connected to the power source and the first and second electrodes. The method may also include the steps of measuring a potential at a photosensor operably connected to the controller, and determining the value of at least one overpotential based on the photosensor potential. Further, the method may include the step of comparing the photosensor potential to a reference potential associated with the selected transmittance state of the electrochromic device. Moreover, the at least one overpotential may have a magnitude that is less than about 4 V over the operating potential.

In another embodiment, the application of at least one overpotential may include applying a plurality of overpotentials. Additionally, applying a plurality of overpotentials may include applying a decreasing sequence of overpotential pulses beginning with a maximum overpotential having a magnitude that is less than about 4 V over the operating potential and ending with a minimum overpotential having a magnitude that is greater than the operating potential (where the operating potential may be, for example, about 1 V). The step of applying a decreasing sequence of overpotential pulses may be decreased according to a first rate of about 0.25 V in about 0.2 seconds or less. Furthermore, the operating potential may have a magnitude that is about 0.5 to 1.5 V. Preferably, the operating potential may have a magnitude that is about 1.0 V.

An additional aspect of the invention includes an apparatus for applying electrical potential to an electrochromic device and configured to electrochromically switch the electrochromic device where the electrochromic device comprises a first electrode comprising a cathodically coloring conducting polymeric material, a second electrode comprising an anodically coloring conducting polymeric material, and an electrolyte disposed between and in electrochemical communication with the first and second electrode. The apparatus of the invention may include a photosensor configured to receive light and convert such light to a photosensor potential. The apparatus may further include a controller in electrical communication with the photosensor and the electrochromic device, the controller configured to deliver a continuous voltage that is pulsed to the electrochromic device in response to the photosensor potential, the continuous voltage sufficient to electrochromically switch the electrochromic device.

In one embodiment, the apparatus may include a potential reference table and may be configured to receive the photosensor potential and compare the said photosensor potential to the potential reference table. In another embodiment, the apparatus includes a power source in electrical communication with the controller. Additionally, the apparatus may provide a pulsed continuous voltage sufficient to electrochromically switch the electrochromic device in less than about 5 seconds or, preferably, less than about 2 seconds.

Accordingly, the invention provides devices and methods that overcome the obstacles present in the field. Specifically, the invention provides pulsed, continuous voltage methodology that applies voltages greatly exceeding that corresponding to the redox stability limits of the subject electrochromic system. However, these voltages are applied for very short periods of time, for example, in the range of several hundred milliseconds (ms) or less. Therefore, the methods and devices of the invention provide greatly increased switching speed (i.e. reduce the electrochromic switching time), by a factor of 10 or more without degrading the electrochromic system.

BRIEF DESCRIPTION OF THE DRAWINGS

The foregoing summary and the following detailed description of the exemplary embodiments of the present invention may be further understood when read in conjunction with the appended drawings, wherein like elements are numbered alike throughout, in which:

FIG. 10 provides a table that illustrates exemplary dark (D) to light (L) and light to dark switching times for devices of the invention utilizing controllers of the invention (A-C) and the utilization of either a BioAnalytical Systems (BAS) potentiostat (A1) and a Princeton Applied Research (PARC) potentiostat (A2).

DETAILED DESCRIPTION OF THE INVENTION

This invention provides a control method and associated controller (e.g., controller circuit) which, when applied to an electrochromic system, reduces the switching time of the system (in going from light to dark states and vice versa) by a factor of 3 or more, as compared to the application of a steady DC voltage from a power source. Among the facets of the control method and controller of the invention are electrochromic devices subjected to electrochromic switching, controllers for applying a continuous voltage that is pulsed to the electrochromic devices, and method for applying potentials to such electrochromic devices.

As used herein, the term "continuous potential" or "continuous voltage" refers to the application of a potential or voltage to a device of the invention wherein the potential is not halted, disconnected, and/or allowed to lapse to an open-circuit potential (OCP) while the continuous potential or voltage is applied, but may be pulsed or otherwise modulated or modified during the application of the potential to a device of the invention.

As used herein, the term "open-circuit potential" refers to the measured potential of a cell from which no current flows in the external circuit. Therefore, when a device is allowed to lapse to its OCP, it is being either halted or otherwise disconnected and a continuous potential or voltage is not being applied.

While the examples cited in the invention are for a particular electrochromic system its principles are applicable to any electrochromic system, as described herein. For example, the present devices and methods of the invention are not limited to polymer-based electrochromic devices and are applicable to devices comprising polymeric materials, metal oxides, liquid crystals, or combinations thereof. However, preferred electrochromic devices of the invention are polymeric electrochromic devices comprising conducting polymers.

Figure 1:
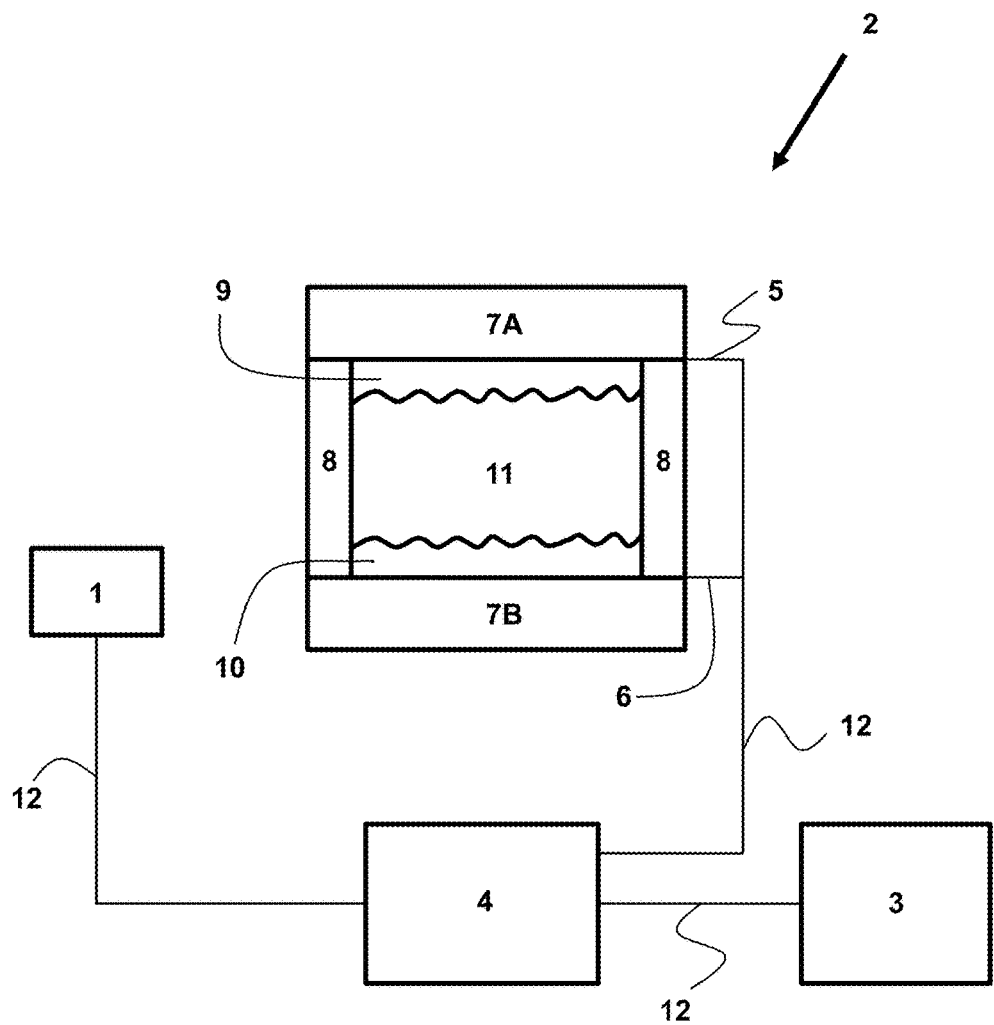
FIG. 1 schematically illustrates an apparatus of the present invention.

Referring now to the figures, wherein like elements are numbered alike throughout, FIG. 1 schematically provides an electrochromic apparatus having a photosensor 1, electrochromic device 2, power source 3, and controller 4. The photosensor 1, electrochromic device 2, and power source 3 may be connected to and thus in electrical communication with the controller via electrical wiring 12.

The photosensor 1 of the invention may be configured or prepared to receive light and convert such light to a photosensor potential. The photosensor 1 may be configured to receive light at a variety of wavelengths including wavelengths in the ultraviolet (UV), visible (vis), near-infrared (NIR), infrared (IR), and/or microwave (μwave) range, for example.

The electrochromic device 2 of the invention may include conducting polymers (CPs), metal oxides (MOs), or liquid crystal based materials. However, regarding the preferred electrochromic devices of the invention, such devices include polymeric materials and are described in U.S. patent application Ser. No. 13/677,197, which was published as U.S. Patent Application Publication No. 2013/0120821, the entire disclosures of which are incorporated by reference herein. Additionally, see International Application No. PCT/US12/65123, published as International Publication No. WO 2013/074702, the entire disclosures of which are incorporated by reference herein. Moreover, there are several examples in the field of the use of polymer-based electrochromic devices including U.S. Pat. Nos. 5,995,273 and 6,033,592, which are incorporated by reference herein.

The electrochromic device 2 includes a first electrode 7A and second electrode 7B where, for example, the first electrode 7A may be a working electrode and the second electrode 7B may be a counter electrode. The first and second electrodes (7A and 7B) may be in electrical communication with and/or connected to the controller via terminals 5 and 6, respectively. Moreover, the electrochromic device 2 may include polymers 9,10 (e.g., conducting polymers) and an electrolyte 11. Additionally, the electrochromic device 2 may include gaskets 8. Gaskets 8 may be composed of thin (less than 1 mil) mylar and may preferably include a double sided adhesive.

With respect to the preferred electrochromic devices, the device 2 is a complimentary electrochromic device. An electrochemically active material possessing highly reversible electrochemical activity may be introduced on a counter electrode and may be configured to act in a complimentary and highly reversible fashion to the material at a working electrode. In such a system, when the electrochromic material at the working electrode undergoes oxidation, the complimentary material at the counter electrode would undergo reduction, and vice versa. Furthermore, when the electrochromic material at one electrode darkens with the application of a (+) potential, the electrochromic material at the other electrode lightens with the application of a (+) potential. Similarly, the electrochromic material at one electrode lightens with the application of a (−) potential, while the electrochromic material at the other electrode darkens with the application of a (−) potential. This leads to a reversible electrochemical system where the active electrochromic devices demonstrate rapid switching times, greater light/dark contrast, highly reversible switching and little degradation over numerous switching cycles, while at the same time reinforcing their dark or light colorations. This is the principle behind complimentarily coloring electrochromic devices.

Further, if one of the electrochromic materials shows activity that is opposite to that of the other, e.g. it turns to its light state on application of a (+) voltage while the other material turns dark on application of a (+) voltage, then this would yield a functioning transmissive-mode, complimentarily-coloring device. If the two materials were ideally matched, so that at the applied voltage at which one is in its darkest state, the other is at its lightest state, this would then constitute an ideal complimentary-coloring, transmissive-mode electrochromic system.

As disclosed herein, a complimentary polymer or "dual-polymer" electrochromic device is provided having electrodes and comprising an anodically-coloring conductive polymeric material, an electrolyte layer, and a cathodically coloring conductive polymeric material.

As used herein, a "coloring conductive polymeric material" is said to be "anodically coloring" if application of a positive voltage to it causes it to transition to a colored or dark state, and "cathodically coloring" if application of a negative voltage causes it to transition to a colored or dark state. Moreover, cathodically and anodically coloring conductive polymeric materials comprise cathodically and anodically coloring polymers, respectively.

As used herein, the term "polymer" refers to the product of a polymerization reaction, and is inclusive of homopolymers, copolymers, terpolymers, etc.

As used herein, the term "homopolymer" refers to a polymer resulting from the polymerization of a single monomer, i.e., a polymer consisting essentially of a single type of repeating unit.

As used herein, the term "copolymer" refers to polymers formed by the polymerization reaction of at least two different monomers and, moreover, the term copolymer is inclusive of random copolymers, block copolymers, graft copolymers, etc.

The cathodically coloring conductive polymeric material of the invention may comprise one or more polymers that comprise an unsubstituted or substituted derivative of 2,2-dibenzyl-3,4-propylene-dioxythiophene monomer. Preferably, when the 2,2-dibenzyl-3,4-propylene-dioxythiophene is substituted, the substitution may be located at the para position of the benzyl group, wherein the substituents at the benzyl moiety may be halo (e.g., chloro, bromo, iodo, fluoro), sulfonyl, nitro, amino or alkyl (e.g., n-propyl, iso-propyl, n-butyl, iso-butyl, n-pentyl, n-hexyl) substituents.

Preferably, the cathodically coloring polymer is a copolymer of monomers based on a 3,4-propylenedioxythiophene skeleton. Examples of such monomers include, but are not limited to, 2,2-bis(4-chlorobenzyl)-3,4-propylenedioxythiophene, 2,2-bis(4-bromobenzyl)-3,4-propylenedioxythiophene, 2,2-bis(4-nitrobenzyl)-3,4-propylenedioxythiophene, 2,2-bis(4-aminobenzyl)-3,4-propylenedioxythiophene and 2,2-dibenzyl-1,3-propylenedioxythiophene.

More preferably, the cathodically coloring conducting polymer is a copolymer of the monomers 2,2-dibenzyl-3,4-propylenedioxythiophene, 2,2-bis(4-chlorobenzyl)-3,4-propylenedioxythiophene, and 2,2-bis(4-bromobenzyl)-3,4-propylenedioxythiophene, taken in a molar ratio of about 1:1:1 to 50:1:1, reflecting the variation of the first monomer's proportion, and again from 50:1:1 to 50:7:1 and 1:1:1 to 1:7:1, reflecting the variation of the second monomer's proportion. More preferably, the above molar ratio is 50:1:1 to 3:1:1. More preferably still, the above molar ratio is 20:1:1 to 3:1:1. Most preferably, the above molar ratio is about 10:1:1. The electrochromic performance of electrochromic devices containing these copolymer systems is seen to be superior to that of devices having only pure polymers of these monomers.

Anodically coloring conducting polymeric materials of the invention may comprise one or more polymers or, more preferably, may be a copolymer of monomers known in the art which include but are not limited to poly(aromatic amine) polymers. Examples of such monomers include, but are not limited to, diphenyl amine, N,N'-diphenyl benzidine, 4-aminobiphenyl and aniline. The anodically coloring polymer is preferably a copolymer of monomers N,N'-diphenyl benzidine, diphenyl amine and 4-aminobiphenyl taken in a molar ratio of about 1:1:1 to 50:1:1, with electrochromic performance seen to be superior to that of the pure polymers of these monomers. Preferably, the above molar ratio is from about 1:1:1 to about 20:1:1. More preferably, the above molar ratio is from about 1:1:1 to about 9:1:1 and even more preferably, the above molar ratio is about 3:1:1 to 7:1:1. In an especially preferred embodiment, the above molar ratio is about 5:1:1.

Preferably, the cathodically and anodically coloring conductive polymers of the complimentary-polymer electrochromic device of the present invention are electrochromically and electrochemically matched. As used herein, the redox potentials of the cathodically coloring polymeric material and anodically coloring polymeric material in a 2-electrode electrochromic device are considered "substantially matched" when, at a given potential, the cathodically coloring polymeric material is fully oxidized and the anodically coloring polymeric material is fully reduced, and vice versa. More particularly, the cathodically and anodically coloring polymeric materials are considered "substantially matched" when the cathodically and anodically coloring polymeric materials both show at least about 85%, about 90%, or about 95% of their total charge transferred corresponding to their electrochromically relevant oxidation or reduction peaks, at a given potential, as determined by examining the area under the curve of the cathodically and anodically coloring polymeric material's individual voltammetric peaks.

Accordingly, where the cathodically and anodically coloring polymeric materials have substantially matched redox potentials, upon application of the (−) potential where the cathodically coloring polymeric material is at its darkest state, the anodically coloring polymeric material is at its lightest state; and, upon application of the (+) potential where the anodically coloring polymeric material is at its darkest state, the cathodically coloring polymeric material is at its lightest state.

Due to this good matching of the electrochemical redox potentials and the electrochromic properties of the complimentary polymers, the dual-polymer devices display electrochromic performance superior to that of the single-polymer devices as well as to prior art dual-polymer devices wherein either the cathodically-coloring or anodically-coloring polymer are different from the above listed polymers and are not electrochromically and electrochemically matched as described above. (Electrochromic performance is described by light/dark contrast, switching speed, cyclability, and related parameters).

In providing the dual-polymer devices of the present invention, the cathodically and anodically coloring polymeric materials may be composed of homopolymers. In preferred embodiments at least one of the cathodically coloring polymeric material and anodically coloring polymeric material may be composed of a copolymer. Most preferably, both the cathodically and anodically coloring polymeric materials are composed of copolymers. The anodically and cathodically coloring polymeric materials may be deposited on transparent conductive substrates which may form opposing electrodes in an electrochromic device with a thin layer (preferably a thin layer) of liquid, gel or solid electrolyte 11 disposed between them. The device may further comprise a means (e.g. gasket) for sealing and containing said electrolyte 11 within the device. The cathodically-coloring polymer comprises substituted and unsubstituted derivatives of poly(2,2-dibenzyl-3,4-propylenedioxythiophene) ("DiBz-PProDOT"). In particular reference to the substituted Dibenzyl-PProDOT, in a preferred embodiment, at least one benzyl moiety is substituted with an amino, nitro, halo, sulfonyl or alkyl group (e.g., propyl, isopropyl, n-butyl, iso-butyl, n-pentyl, n-hexyl). As used herein, "halo," may be defined as comprising fluoro, chloro, bromo and iodo substituents. In a particularly preferred embodiment, the para position of the benzyl group is substituted.

In preferred embodiments, the cathodically-coloring polymers exhibit large electrochromic contrast and electrochemical and electrochromic compatibility with anodically-coloring polymers. DiBz-PProDOT polymers with dichloro- or other substituents at the para-position of each of the benzyl groups, may exhibit very significant improvement in electrochromic properties over their unsubstituted-dibenzyl-counterparts. In particular, with the substitution at the dibenzyl group, the polymer absorption may change such that it is more broad-band; additionally, the wavelength of highest absorption may also shift, potentially more towards the center of the visible spectral region (approximately 575 nm), and again, potentially, the switching voltages may be slightly lowered and made more symmetrical. Substitution at the dibenzyl group may provide, for example, a significant increase in the absorption, leading to a much higher light/dark contrast, and a shift in the redox potential, leading, potentially, to a much better match with anodically-coloring polymers such as poly(aromatic amines) in a dual-polymer device. Production of these polymers is achieved via electropolymerization from the substituted-dibenzyl monomer, according to established conducting polymer electrochromics practice.

The anodically coloring polymers used in the electrochromic device may be those materials known in the art and may include but are not limited to: poly(pyrrole); poly(diphenyl amine); poly(4-amino-biphenyl); poly(aniline); poly(N,N'-diphenyl benzidine); poly(phenylene); poly(phenylene vinylene); poly(allylene vinylene); and poly(amino quinoline).

A preferred composition for the anodically coloring polymer is a copolymer of N,N'-diphenyl benzidine, diphenyl amine, and 4-amino-biphenyl, in a ratio of about 1:1:1 to 50:1:1 to, with electrochromic performance seen to be superior to that of the pure (i.e. non-copolymer) polymers of these monomers. More preferably, the above molar ratio is from about 1:1:1 to about 20:1:1 and even more preferably, the above molar ratio is about 10:1:1 to 20:1:1. In other preferred embodiments, the above molar ratio is about 3:1:1 to 9:1:1, and even more preferably, the above molar ratio is about 4:1:1 to 7:1:1. In a specifically preferred embodiment, the above molar ratio is about 5:1:1

Additionally, the first and second electrodes 7A and 7B, respectively, may include a substrate. Such substrates are preferably ITO (indium tin oxide) on a chemically inert plastic such as poly(ethylene terephthalate) (PET), i.e. ITO/Mylar®, although any other conductive, transparent substrate may be used, such as: ITO/glass; doped tin oxide on glass or plastic; very thin (less than about 60 nm) Au on plastic or glass; "NESA" glass; and a more recently studied substrate, carbon nanotubes on plastic or glass. For the preferred substrate, ITO/Mylar, the preferred surface resistivity is less than about 60 Ohms/square (dimensionless units). In certain preferred embodiments, the substrate may be ITO/Mylar having a thickness of about 0.25 to 7 mil.

Furthermore, certain embodiments where the underlying substrate is comparatively less conductive, e.g. indium-tin-oxide (ITO) on glass or plastic (e.g. poly(ethylene terephthalate) or Mylar®), the switching speed of the device from one extreme electrochromic state (e.g. darkest) to another (e.g. lightest) can be slowed, and the transition can also be uneven, with the electrochromic material closer to the point of electrical contact switching fastest and that furthest from the point of electrical contact switching slowest, the transition then clearly visible. One simple means of increasing the switching speed (and also the evenness of the switching) is to increase the voltage applied on the system. For example, in the case of an electrochromic material having poly (aniline), one could increase the applied voltage could be increased from the determined room-temperature limits of ±1.1 V to, for example, ±2.0 V or ±3.0 V or ±4.0 V. However, a risk of irreversible damage to the electrochromic system is present, with perhaps only a marginal increase in the switching speed (reduction in switching time); after a few such switches, the electrochromic device may essentially stop functioning.

Regarding electrolyte 11, such electrolyte may be a preferred electrolyte that uses a polymer such as poly(methyl methacrylate) (PMMA) or poly(ethyl methacrylate) (PEMA) as a matrix, appropriate salts such as Li trifluoromethane sulfonate (Li triflate) and $LiBF_4$, and plasticizers and/or further solvating agents such as propylene carbonate, which is an organic solvent (typically used in Li battery electrolytes) with a very high b.p., 240° C., and acetonitrile, which is evaporated off before formation of the final gel electrolyte. Once set, the gel electrolyte resembles a hard but flexible, rubbery plastic.

The invention further utilizes a power source 3 for providing a potential or voltage to the electrochromic device 2. The power source 3 may include any source of direct current (DC) to the controller 4 and/or electrochromic device 2. In certain embodiments, the power source 3 could include a source of alternating current (AC) that is converted to DC, as is known in the art. Preferably, the power source 3 is a battery. As used herein, the term "battery" refers to an electro-chemical device comprising one or more electro-chemical cells and/or fuel cells, and so a battery may include a single cell or plural cells, whether as individual units or as a packaged unit. A battery is one example of a type of an electrical power source suitable for a portable device.

Turning to controller 4, the controller (e.g., controller circuit), which is in electrical communication with photosensor 1, electrochemical device 2, and power source 3, is configured to deliver a continuous voltage or potential that is pulsed, according to certain methods of the invention, to the electrochromic device in response to a photosensor potential. The controller 4 may be further connected to the electrochromic device 2 via electrical wiring 12 and terminals 5 and 6, which are located at the first electrode 7A and second electrode 7B, respectively. The controller 4 may include a potentiostat. In preferred embodiments, the controller 4 is a controller circuit that includes an amplifier, a voltage regulator, and microcontroller unit (MCU), as set forth, for example, in FIG. 2.

More preferably, the electrochromic system or device may be controlled by a microchip-based controller that uses photosensor input (e.g., photosensor potential) of the ambient light level and a pre-set, desired light level behind the electrochromic system (e.g., at the eye level of the wearer in the case of electrochromic sunglasses). Furthermore, the controller circuit allows for voltage application only to achieve the desired % Transmission of the electrochromic system (i.e. the desired light level), after which the voltage application ceases and the Controller goes into a dormant, monitoring-only mode (monitoring the ambient light level via the photosensor output (i.e., photosensor potential)), thus greatly conserving battery power.

With respect to the methods, the invention provides a method for modulating the transmittance of an electrochromic device, such as electrochromic device 2. The method of the invention provides for delivering a continuous voltage from a power source across the electrodes of the electrochromic device 2 and pulsing the continuous voltage according to a pulse sequence that may be provided by controller 4. The pulse sequence may briefly apply one or more overpotential pulses and then briefly apply an operating potential pulse. Then, the method includes halting delivery of the continuous voltage to the electrodes of the electrochromic device once a selected transmittance state of the electrochromic device is reached.

Figure 2:
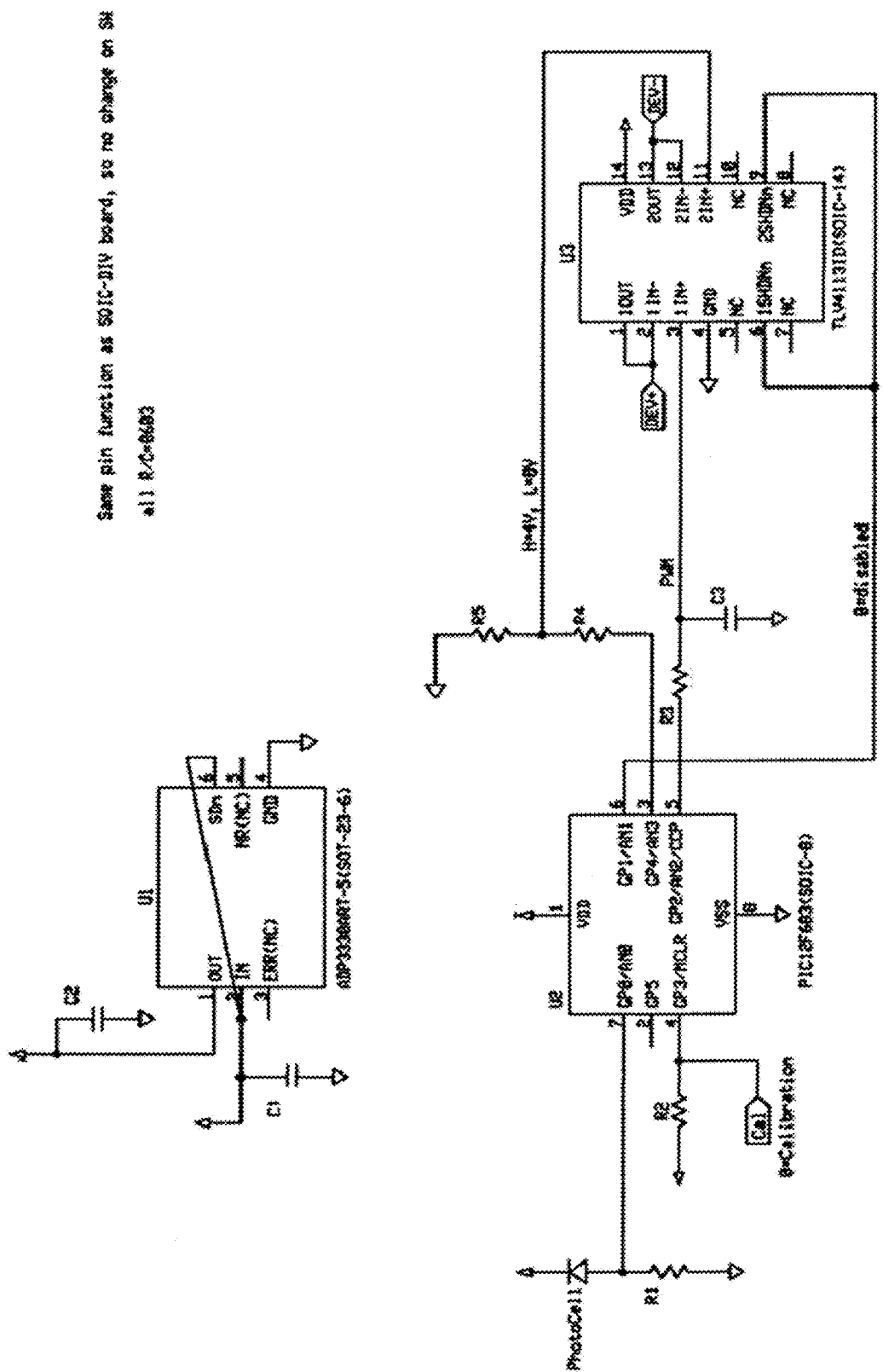
FIG. 2 schematically illustrates an exemplary control circuit of the present invention that includes a microcontroller unit (MCU), an amplifier, and a voltage regulator in connection with a photosensor (i.e., photocell).

In an exemplary methodology, light incident on a photosensor 1 may be read by the controller 4 (e.g., control circuit) as a voltage emanating from the photosensor 1, and is compared to a look-up table stored in a microcontroller unit where the lookup table may function as a reference to determine what potential or potential program should be applied to the electrochromic device 2 based on the incident light at the photosensor 1 and the preferences of the user. Further, in certain embodiments, the microcontroller can be based on a commercially available chip, such as a PIC chip. FIG. 2 demonstrates an exemplary circuit diagram of a typical controller circuit.

Regarding the application of voltages or potentials in the methods of the invention, as used herein, the term "overpotential" or "overvoltage" refers to a potential or voltage that is greater in magnitude than the operating potential of an electrochromic system. Accordingly, the values of overpotentials disclosed herein are defined with respect to a given operating potential. For example, in a system where the operating potential is ±1.0 V, the overpotentials applied may be 2.0 V greater in magnitude than the operating potential (i.e., ±3.0 V). In the present invention the overpotentials may be less than about 5.0 V greater in magnitude than the operating potential. In certain embodiments, the overpotentials may be less than about 3.0 V greater in magnitude than the operating potential. In additional aspects, the overpotentials may be less than about 2.0 V greater in magnitude than the operating potential.

As used herein, the term "operating potential" or "operating voltage" refers to the voltage or potential limit where, if applied to an electrochromic system, will provide an electrochromic transition between the light state and dark state (i.e., 10% to 90% of steady state light and dark % T at approximately the wavelength of maximum absorption of the system), or vice versa, in the electrochromic system while failing to cause substantial irreversible oxidative damage to the system. As recognized by the person having ordinary skill in the art, the operating potential may vary depending on the composition or identity of the electrochromic system. For example, in the preferred embodiments of the present invention, the operating potential may be about ±1 V. Additionally, as used herein, a "selected transmittance state" refers to the level of lightness or darkness that is selected by the user of the device and which is provided by the electrochromic device upon delivery of the operating potential to the electrochromic device.

Moreover, in the methods of the invention, a series or sequence of overpotential pulses may be applied to the electrochromic device. In providing the pulse sequence, the sequence may begin with the application of a large or maximum overpotential, for a brief period of time in order to prevent oxidative degradation, followed by additional overpotential pulses that may, preferably, decrease in magnitude with respect to the operating potential. More preferably, application of pulses includes the application of a decreasing sequence of overpotential pulses beginning with the maximum overpotential pulse and ending with a minimum overpotential. Following the application of the minimum overpotential pulse, the method of the invention includes the application of an operating potential pulse. Preferably, the maximum overpotential applied may have a magnitude that is less than about 5.0 V over the operating potential. More preferably, the maximum overpotential applied may have a magnitude that is less than about 3.0 V over the operating potential. Moreover, the preferred minimum overpotential applied may have a magnitude that is greater than the operating potential (which may be, for example, preferably about ±1 V).

Regarding the length of time in which overpotential pulses may be applied, such pulses may be applied for less than about 0.5 seconds. Preferably, such overpotential pulses may be applied for less than about 0.25 seconds. More preferably, such overpotential pulses may be applied for less than about 0.2 seconds. In certain embodiments where the overpotential is pulsed, the operating potential may be applied to the electrochromic device either before or after the application of an overpotential for a length of less than about 0.5 seconds or, preferably, less than about 0.2 seconds.

However, there is a tradeoff between the magnitude and duration of the overvoltage applied and the reduction in switching time of the electrochromic system and also whether or not it suffers any irreversible redox damage. Moreover, the selection of the magnitude and duration of the overvoltage can be specific to a particular electrochromic system based on general principles applied to specific characteristics of the system, such as the recommended applied potentials for electrochromic switching (based on its CV, chronoamperometry (CA) characteristics, and other electrochemical analyses known in the art).

Certain known devices provide for the application of an overvoltage (or overpotential) to an electrochromic device comprising a single-electrochromic system (i.e. not a complimentary polymer, dual-electrochromic system such as the system of the present invention). A crucial feature of such methods is the necessity of constant monitoring of the open circuit potential (OCP) of the electrochromic system, with the decision on what further voltage pulses to apply depending on the value of such OCP. In between the voltage pulses applied, there may always be an interlude of the OCP, which, additionally, is monitored. Indeed, such devices fail to provide a continuous voltage or potential that is pulsed, as set forth in the present invention. Rather, the devices known in the art apply non-continuous voltage pulses allowing the electrochromic device therein to lapse to the OCP prior to the application of an additional pulse. In contrast, the present invention has no such need to monitor or ever determine the OCP. Indeed, in the present invention, no use is made of the OCP and, furthermore, during the application of the devices and methods of the invention, the electrochromic device does not lapse to the OCP.

As an exemplary method of determining the optimal magnitude of applied overpotentials, the operating potential (i.e., potential limits) for the electrochromic system should first be determined. Initially, a CV of the system is provided at the slowest practical scan rate, typically 5 mV/s. Then, the limits of the potential that can be applied to the system for a reversible redox (oxidation/reduction) and accompanying electrochromic switching may be identified. For example, the limits or operating potential may be ±1.0 V. The light-to-dark and dark-to-light state switching times may then be determined for the electrochromic system (10% to 90% of steady state light and dark % T at or close to the wavelength of maximum absorption of the system), with this ±1.0 V being applied by a standard DC power supply or potentiostat. The dark-state and light-state %-Transmission of the system may also be characterized at these voltages in the UV-Vis-NIR range (typically, about 200 to 11 nm). A small increment of voltage may be selected, about 0.5 V, and applied as an overvoltage to the system for a small increment of time, about 100 ms. An additional CV is again taken to determine if any degradation of the electrochromic system occurred. For example, −1.5 V may be applied to the electrochromic system for 100 ms and with the CV and the UV-Vis-NIR spectra provided to determine degradation. If no degradation is observed, +1.5 V may be applied for 100 ms followed by another CV and UV-Vis-NIR analysis to determine system degradation. If no degradation is observed, then the light-to-dark and dark-to-light state switching times may be determined for the electrochromic system using this incremental voltage. The next time increment is progressed to about 200 ms, up to no more than about 500 ms. In the absence of degradation, the next increment of voltage may be applied (about ±2.0 V, for example). This procedure is continued until a method is provided for a selected electrochromic system, that yields the shortest switching times without any observable degradation of the polymer electrochromic system (as determined by its voltammetric and %-Transmission (UV-Vis-NIR spectral) behavior).

Based on the preceding analyses, several exemplary methods for switching the electrochromic devices described herein were developed. These methods include several Programs designated A, B, C, and D, as further described below, identified for application to the described electrochromic devices of the invention. However, other programs may be arrived at using similar principles, which could also be used. Each of these programs yields significantly faster switching, as well as good stability (i.e. lack of redox or other degradation of the electrochromic system) over thousands of light/dark switching cycles, when compared with "standard" switching using a laboratory potentiostat. Several DC operating potentials could be applied to the electrochromic devices of the invention. Indeed, the operating potential is a function of the electrochromic device utilized. In the present invention, the operating potential may be about (+) 0.5 to 1.5 V for the dark state and about (−) 0.5 to 1.5 V for the light state. However, the preferred DC voltage (i.e., operating potential) to be applied to a system of the invention is about (+) 1.0 V for the dark state and about (−) 1.0 V for the light state.

Figure 3:
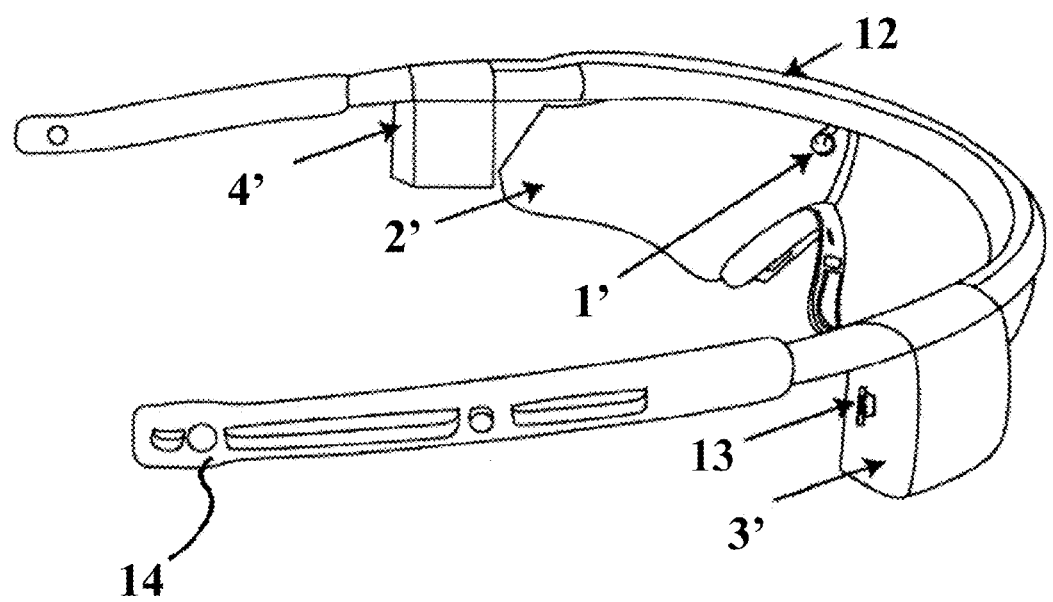
FIG. 3 schematically illustrates an embodiment of the present invention, where the apparatus is configured in the form of a pair of wearable electrochromic lenses.

For purposes of testing all program embodiments, the apparatus of the invention including an electrochromic device was prepared and may be worn as electrochromic spectacles, of the type shown FIG. 3. Indeed, the apparatus of FIG. 3 provides a photosensor 1', an electrochromic lens 2' (i.e., an electrochromic device), a battery 3', and a controller 4'. The photosensor 1', electrochromic lens 2', and battery 3' are electrically connected to the controller via wiring 12. Preferably, the battery 3' includes a charging port 13 that may be a micro-USB charging port. The apparatus of FIG. 5 further includes a lens frame 14 from which the elements of the invention are attached.

Regarding the development and application of the programs of the invention, photosensor data is utilized as the photosensor potential, which is produced in response to received light, as set forth above. In preferred embodiments, the user pre-selects and sets (i.e. "calibrates") the light level desired at the eye, or this is "factory-set" at the time of production. This light level is then programmed into the Controller circuit in the form of the voltage output from the photosensor. Then if, in operation of the electrochromic spectacles when worn by the user, there is determined to be too much light incident at the photosensor, a particular program (e.g., one of programs A, B, C, D, as described below), is applied to bring it to a dark state; and conversely, if the electrochromic is determined to be in too dark a state, the voltage program is applied to bring it to a light state. Additionally, upon operation of the method of the invention, either before or after calibration of the device, where calibration occurs automatically as part of the method, there may be a programmed delay from about 10 ms to 10 seconds, and preferably about 100 ms, as necessary. Moreover, after initialization and startup of the method, and prior to a reading of the voltage from the photosensor and/or a reference potential voltage that may be stored at the microcontroller, the method of the invention may include a delay, a programmed delay from about 10 ms to 10 seconds, and preferably about 100 ms, as necessary.

For the four exemplary programs A, B, C and D, elaborated on further below, the largest voltage applied is about 2.0 V in magnitude greater than the operating potential (e.g., ±3.0 V). These overpotentials have been determined based on studies of this particular electrochromic system as described above. However, the person having ordinary skill in the art would recognize that different electrochromic systems (e.g., polymeric electrochromic systems) would require different operating potentials and different overpotentials while still being encompassed within the invention.

Turning to the first program, A, to switch to the light state, the controller applies (−) 3.0 V for 0.1 s, then steps to (−) 2.75 V and applies this for 0.1 s, then to (−) 2.5 again for 0.1 s, then to (−) 2.25 V again for 0.1 s, then to (−) 2.0 V also held for 0.1 s. For the next 1.0 V program the step voltage remains the same, i.e. 0.25 V; however, the duration of the hold at each voltage is now increased to 0.2 s from 0.1 s. This is done until (−)1.0 V is reached. When the desired darkness or lightness is achieved (i.e., selected transmittance state of the electrochromic device), as determined by the light incident on the photosensor, the voltage is switched off and/or halted.

For switching to the dark state, the same procedure is followed, except that the polarities of the applied voltage and step are reversed. This program may then be expressed in shorthand notation as:
Program A:
  0.25V/0.1 s (±3.0, ±2.75, ±2.5, ±2.25, ±2.0)
  0.25V/0.2 s (±2.0, ±1.75, ±1.5, ±1.25, ±1.0)
Using similar shorthand notation, the other three programs may be denoted as follows:
Program B:
  0.25V/0.1 s (±3.25, ±3.0, ±2.75, ±2.5, ±2.25)
  0.25V/0.2 s (±2.25, ±2.0, ±1.75, ±1.5, ±1.25, ±1.0)
Program C:
  0.25V/0.15 s (±3.0, ±2.75, ±2.5, ±2.25, ±2.0)
  0.25V/0.2 s (±2.0, ±1.75, ±1.5, ±1.25, ±1.0)
Program D:
  0.25V/0.2 s (±2.75, ±2.5, ±2.25, ±2.0)
  0.25V/0.2 s (±2.0, ±1.75, ±1.5, ±1.25, ±1.0)

The programs of the invention, and the preferred programs A, B, C, and D, may be enclosed in the controller 4 of the invention, but preferably in the MCU of the controller 4. However, methods and, more specifically the programs of the present invention, can be embodied as a computer implemented process or processes for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, a punched card reader, a magnetic tape reader, a magnetic card reader, a memory card reader, an optical scanner, as well as machines for reading the storage media mentioned above.

The following examples describe the invention in further detail. These examples are provided for illustrative purposes only, and should in no way be considered as limiting the invention.

EXAMPLES

Example 1

Figure 4:
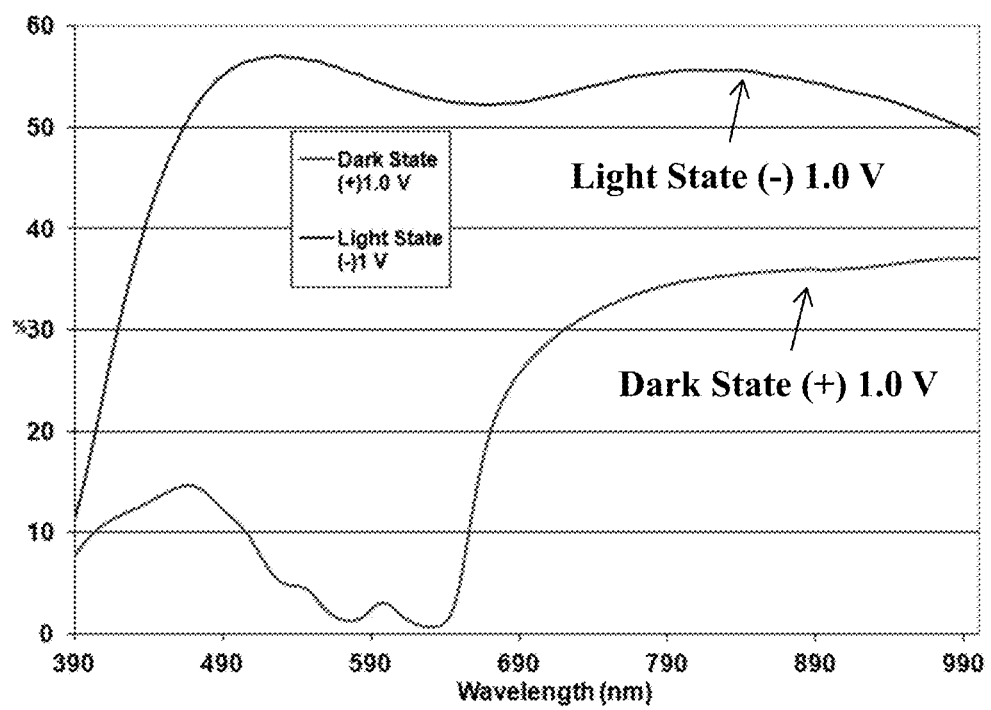
FIG. 4 provides the transmission spectrum of an exemplary electrochromic device disclosed herein and indicates the transmittance of the device in the dark state (+1 V) and the light state (−1 V) of the device.

An electrochromic device was prepared utilizing a cathodically coloring conducting polymer that includes the monomer 2,2-bis(4-chlorobenzyl)-3,4-propylenedioxythiophene and an anodically coloring conducting polymer that includes the monomer N,N'-diphenyl benzidine. Regarding the properties of the electrochromic device described above, the typical transmission (% T) spectrum, in the UV-Vis-NIR region, of such device is disclosed in FIG. 4.

Figure 5:
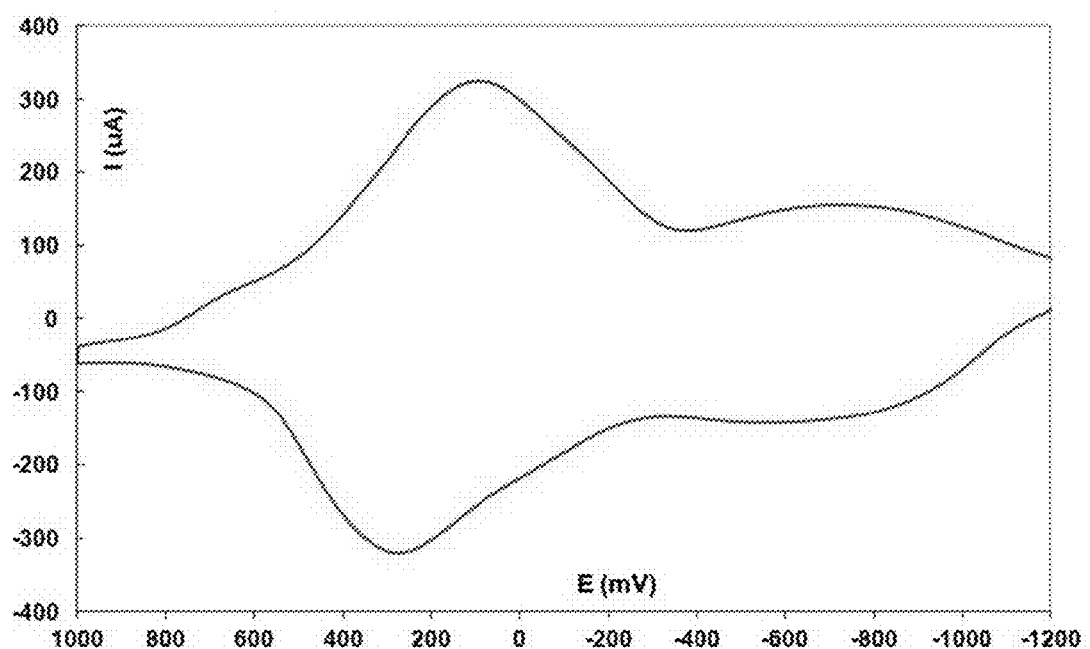
FIG. 5 provides a cyclic voltammogram (CV) of an exemplary device at a scan rate of 10 mV/s where the device an applied voltage between −1 and +1 V; accordingly the device appears reversible.
Figure 6:
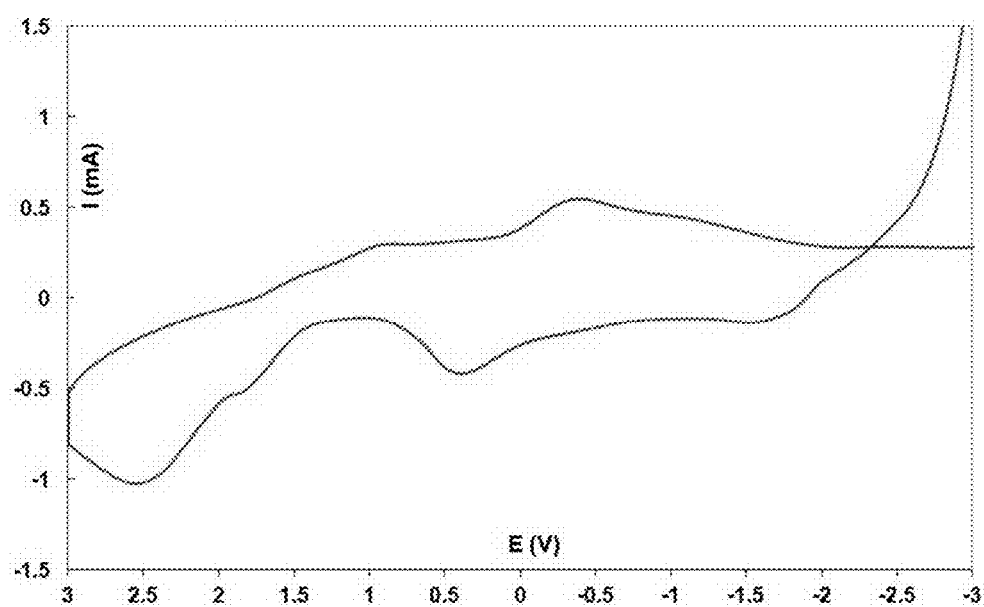
FIG. 6 provides a cyclic voltammogram (CV) of an exemplary device at a scan rate of 10 mV/s where the device is subject to an applied voltage between −3 and +3 V; the device demonstrates irreversibility due to degradative oxidation of the device due to the application of an excessive overpotential.

Additionally, a cyclic voltammogram (CV) of the electrochromic system is disclosed in FIG. 5, taken at a very slow scan rate (10 mV/s); this CV is of an exemplary electrochromic lens in 2-electrode mode, i.e. with no reference electrode. The highly reversible nature of the redox behavior for this system is demonstrated herein. Indeed, the primary and secondary voltammetric peaks responsible for the electrochromism, [primary at about +250 mV (oxidation, (−) current) about +200 mV (reduction, (+) current), secondary at about −850 mV (oxidation), +850 mV (reduction)] nearly overlap, which is a feature of a highly reversible system. This voltammogram further, demonstrates that the potential limits for application of a voltage for achieving an acceptable electrochromic transition between the light and dark states lie between about (−) 1.0 V and (+) 1.0 V. FIG. 6 shows the CV of the same system, identical except that it is for an expanded window, between (−) 3.0 V and (+) 3.0 V. Several irreversible peaks are visible, the most prominent one being at ca. +2.55 V, which may be ascribed to an irreversible oxidative degradation of one of the polymers; it may be noted that there is no corresponding reductive peak for this oxidative peak. This expanded CV indicates that if an overvoltage were applied to the system to attempt to make it switch faster, the system may undergo irreversible oxidative damage.

However, in practice, due to the fact that the underlying ITO/Mylar substrate has a surface resistivity of approximately 50 Ohms per square, when one applies a voltage of (+)1.5 V, the CP (which is the active electrochromic), especially that which is at some distance from the point of electrical contact, does not actually experience a voltage of (+)1.5 V immediately. Rather, due to this surface resistivity of the substrate, only over a considerable length of time (20 to 30 minutes) is the full (+)1.5 V experienced by the CP at the interior of the device. Alternatively, experimental observation demonstrates that when such an overvoltage is applied, the electrochromic device is observed to electrochromically switch faster. And furthermore, the larger the overvoltage applied, the faster the switching. Additionally, if the overvoltage is applied for very short periods of time, generally less than about 0.5 s (500 ms), the integrity of the electrochromic devices are preserved over thousands of light/dark switching cycles.

Accordingly, as demonstrated in FIG. 5, the potential limits of the preferred electrochromic device are ±1.0 V.

Example 2

In practice of the present invention, the photosensor readings, which may be in mV corresponding to particular light levels, may be used as key inputs by the programs of the invention in determining how to drive the electrochromic device, i.e., what voltages to apply and for what duration. For this purpose, the programs of the invention may be associated with a lookup table that may be held in the controller 4 or, more specifically, the microcontroller. A representative look up table is provided herein as Table 1.

Figure 7:
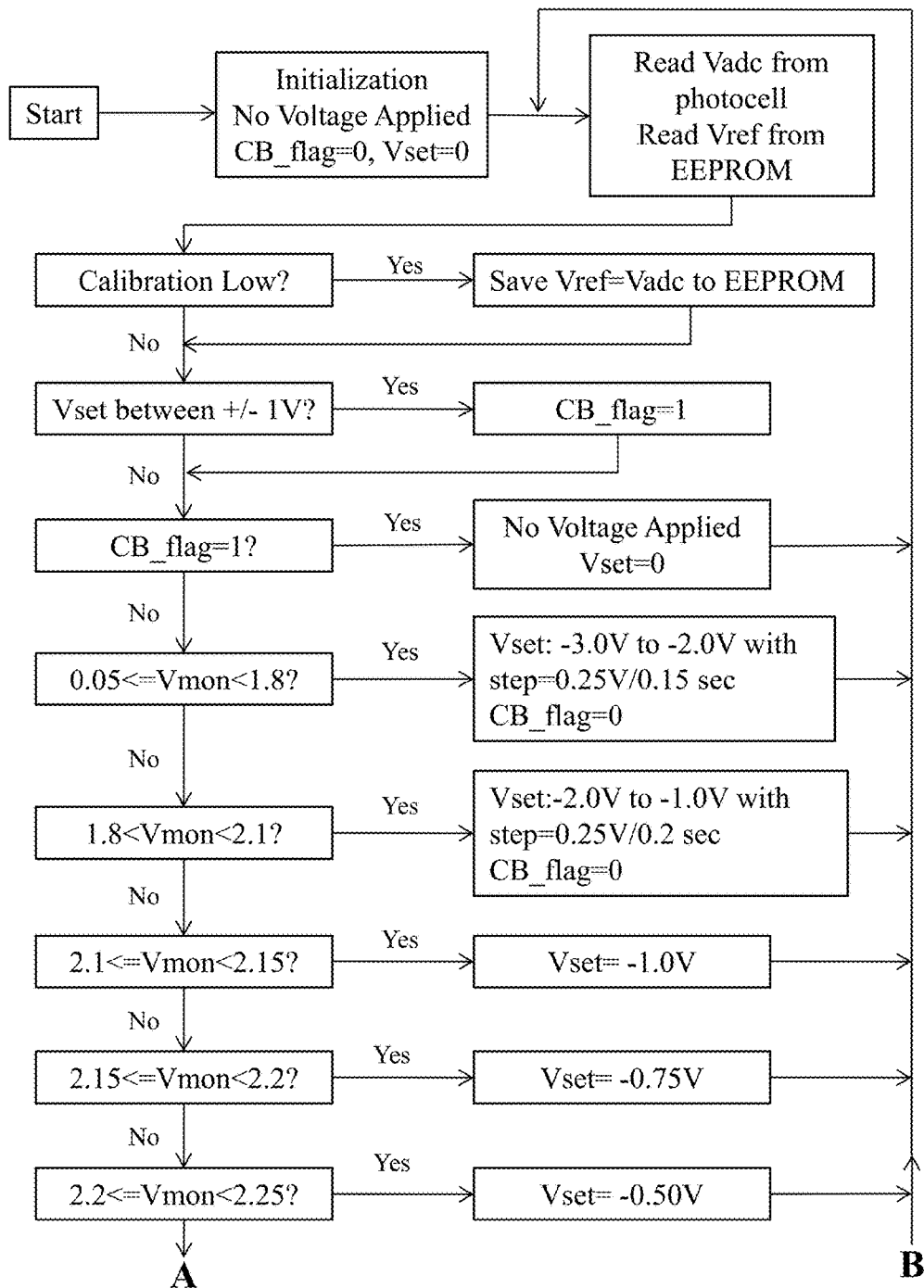
FIG. 7 provides an exemplary process of the invention that schematically illustrates the application of a potential program via a controller to an electrochromic device. The figure further recites a circuit breaker (CB), CB_flag (1=yes, 0=no), voltage output of a photocell ($V_{adc}$), calibration voltage for photocell ($V_{ref}$), voltage applied to the electrochromic device ($V_{set}$), a voltage application tool ($V_{mon}$) where $V_{mon}=(V_{adc}+2.5)-V_{ref}$, and an electrically eraseable programmable read-only memory (EEPROM).
Figure 7:
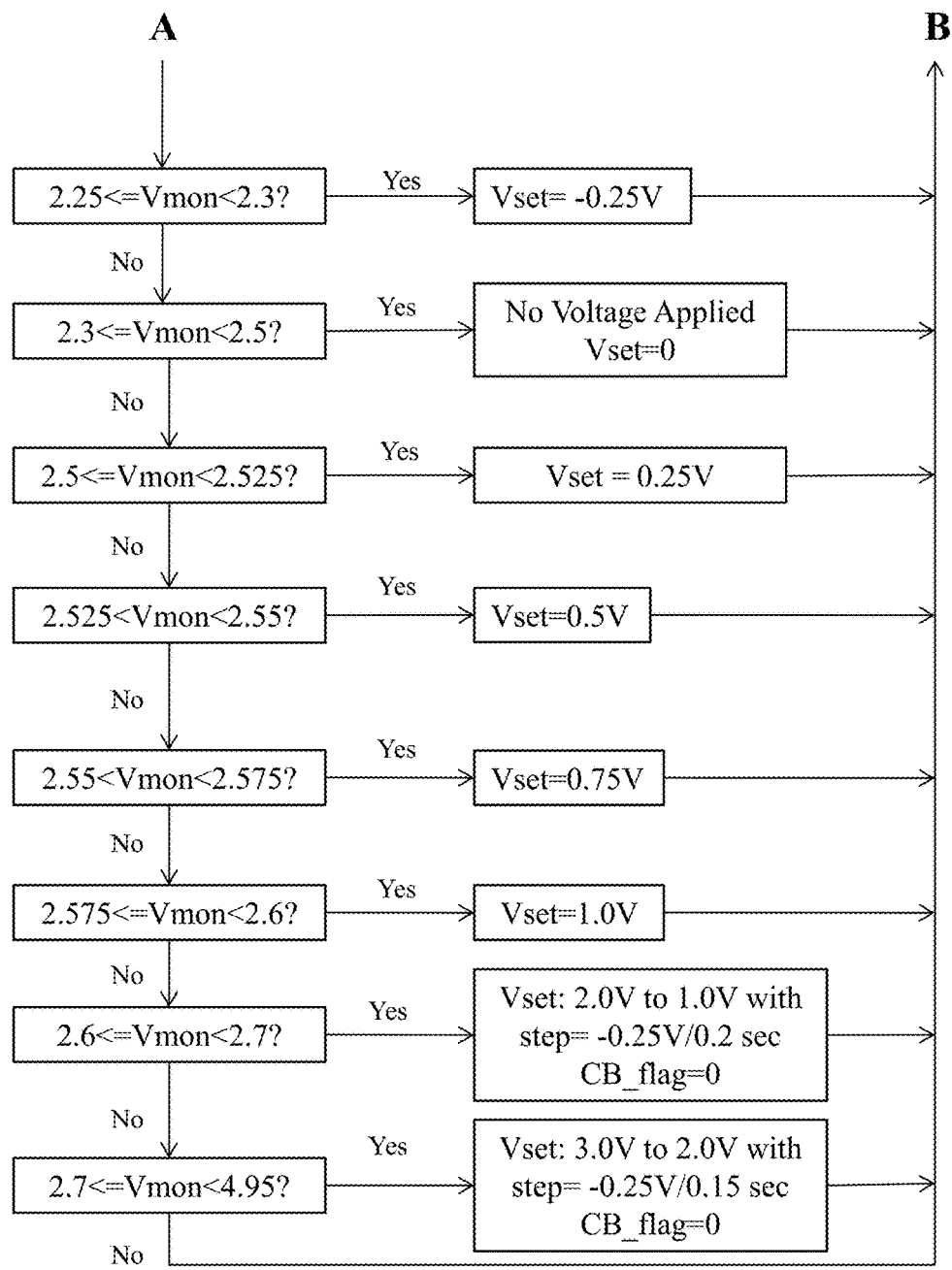

At a reference light level, the reference voltage may be calibrated to 2.5 V; the calibration factor is saved to an EEPROM inside the microcontroller. During normal operation, the photocell voltage ($V_{pc}$) is calibrated with the saved calibration factor. The device voltage ($V_{dev}$) is adjusted based on the programs of the invention including A, B, C, and D. $V_{dev}$ is adjusted in steps of 0.25V. (see, for example, FIG. 7).

TABLE 1

A Representative Look-Up Table

| $V_{pc}$ range (hex value) | $V_{dev}$ |
|---|---|
| 50-1800 mV(0x0032-0x0708) | −3.0 V (A, B, C, D) |
| 1800-2100 mV(0x0708-0x0834) | −2.0 V (A, B, C, D) |
| 2100-2150 mV(0x0834-0x0866) | −1.0 V |
| 2150-2200 mV(0x0866-0x0898) | −0.75 V |
| 2200-2250 mV(0x0898-0x08CA) | −0.50 V |
| 2250-2300 mV(0x08CA-0x08FC) | −0.25 V |
| 2300-2500 mV(0x08FC-0x09C4) | Voltage turned off |
| 2500-2525 mV(0x09C4-0x09DD) | +0.25 V |
| 2525-2550 mV(0x09DD-0x09F6) | +0.50 V |
| 2550-2575 mV(0x09F6-0x0A0F) | +0.75 V |
| 2575-2600 mV(0x0A0F-0x0A28) | +1.0 V |
| 2600-2700 mV(0x0A28-0X0A8C) | +2.0 V (A, B, C, D) |
| 2700-4950 mV(0x0A8C-0x1356) | +3.0 V (A, B, C, D) |

Example 3

Figure 8:
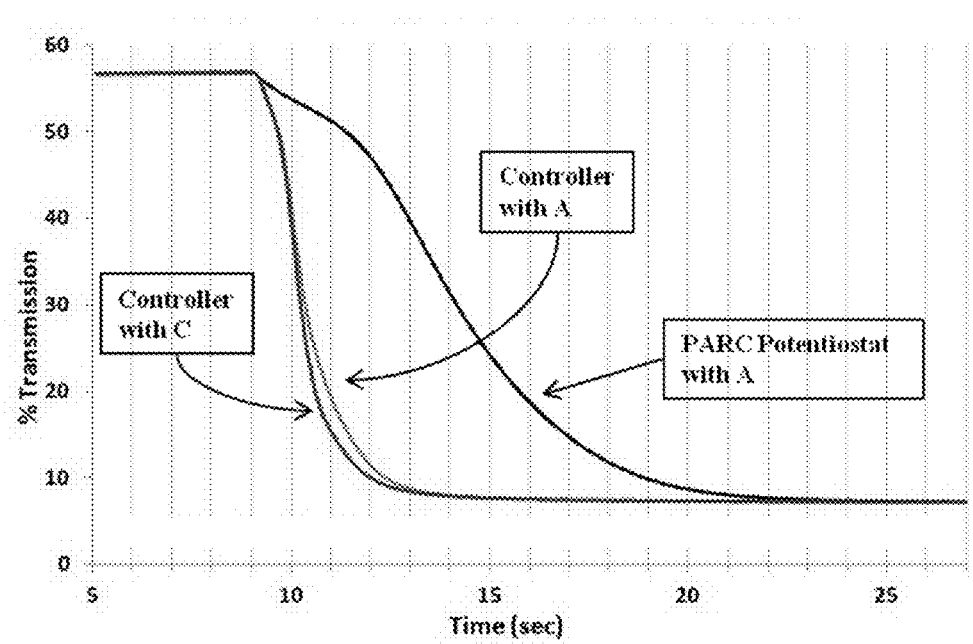
FIG. 8 provides a transmittance analysis that graphically illustrates a comparison between the application of continuous potentials to an exemplary electrochromic device using a commercial potentiostat applying Program A, the controller of the invention applying Program A, and the controller of the invention applying Program C. As demonstrated therein, the controller of the invention applying Program C displayed the shortest electrochromic switching time.
Figure 9:
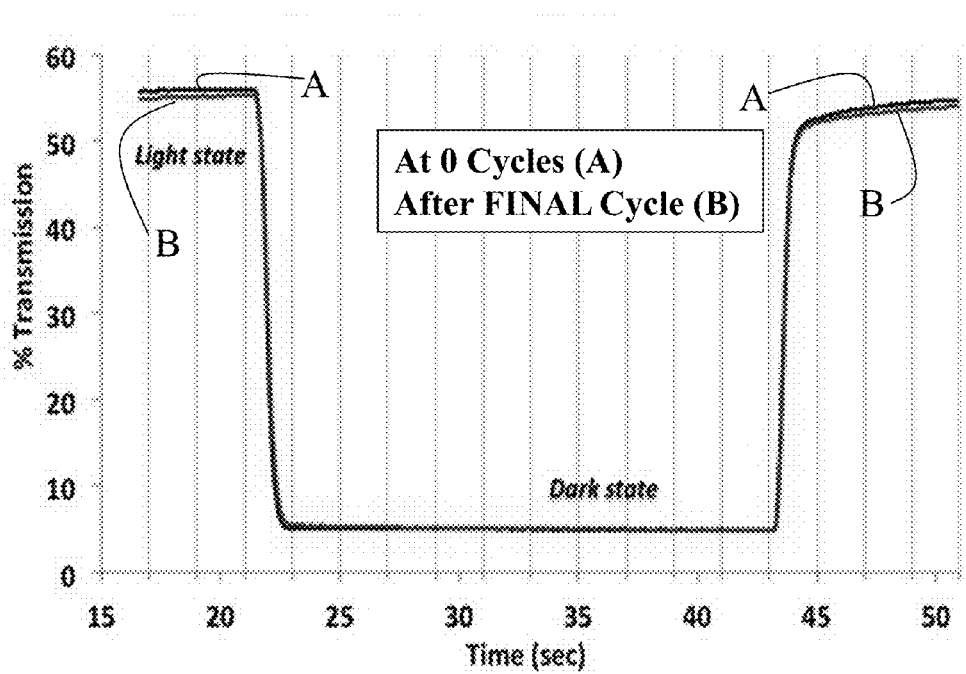
FIG. 9 provides a cyclability analysis that graphically illustrates the long term durability of an electrochromic device where Program C is provided by a controller of the invention. In the cyclability analysis, the cyclability of a device having 0 cycles is compared to a device that has been cycled 10,000 times. The analysis demonstrates that there are minimal differences in cyclability after prolonged use.

Demonstrating the differences between the application of the programs of the invention in comparison to the use of a potentiostat, an examination of switching times may be observed (FIG. 8). Indeed, FIG. 8 demonstrates a comparison of the switching time using a steady DC voltage, as applied from potentiostat (or a DC power source), and that obtained using programs A and C (used as examples). The switching time is reduced, from approximately 8 s for the potentiostatic DC voltage to less than 1 s for program C. As set forth above, the switching time is defined customarily as the time for transition between 10% and 90% of the maximum and minimum % T, and the above values are measured using this definition. Additionally, FIG. 9 demonstrates the long term cyclability, at 0 and 10,000 cycles between light and dark states, using program C. There is almost no effect on the electrochromic switching characteristics and stability of the system, even though an overvoltage of ±3.0 V has been applied to the system 10,000 times for very short periods of time. A more than 8-fold reduction of switching time, from about 8 s to less than 1 s, as above, provides a commercially viable electrochromic lens because a commercially viable electrochromic lens possesses a switching time of less than 1 s, whereas a non-viable lens possesses a switching time of generally greater than 8 s, which is less than approximately half of photochromic lenses.

A further comparison of the switching time of the electrochromic devices operated on or using the methodology of the invention is provided in FIG. 10. Indeed, FIG. 10 demonstrates representative data comparing switching times obtained using two commercially available potentiostats with those obtained using the controller of the present invention and programs A, B, and C. The use of the programs leads to dramatic reductions in the switching time. In addition, the effects on the switching time of various applied overvoltages and durations of their application, as embodied in these programs (as described above), is also clearly seen in the data comparing the three programs A, B, and C.

The present invention provides a significant advancement in the field of electrochromic devices and, more particularly, in the development of devices and methods that control and utilize electrochromic devices. Specifically, the present invention utilizes a photosensor for accurate real time control where the light level incident on the photosensor determines whether or not the existing electrochromic state of the electrochromic device (i.e., its lightness/darkness) requires switching. Moreover, there is no need or requirement by the apparatus to halt the continuous application of a potential or voltage in order to monitor or utilize the OCP of the electrochromic device. The device is capable of being calibrated and modified to suit the user's preferences.

Additionally, the apparatus of the invention has a lower power design, provides a fast response to the application of the pulsed continuous voltage, and may be provided in a small or compact design for high portability. Rather than requiring multiple power supplies, the invention requires only a single power supply or source, such as a portable battery. Finally, rather than simply providing a constant or static potential to electrochromic devices, the apparatus of the invention reduces switching times while improving cyclability by incorporating a "smart" applied-potential method (e.g., programs A-D), as described above, with a small potential-step size.

A number of patent and non-patent publications are cited herein in order to describe the state of the art to which this invention pertains. The entire disclosure of each of these publications is incorporated by reference herein.

While certain embodiments of the present invention have been described and/or exemplified above, various other embodiments will be apparent to those skilled in the art from the foregoing disclosure. The present invention is, therefore, not limited to the particular embodiments described and/or exemplified, but is capable of considerable variation and modification without departure from the scope and spirit of the appended claims.

Moreover, as used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Furthermore, the transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinary associated with the specified material(s). The term "consisting essentially of" limits the scope of a claim to the specified elements, steps or material(s) and those that do not materially affect the basic and novel characteristic(s) of the claimed invention. All devices and methods described herein that embody the present invention can, in alternate embodiments, be more specifically defined by any of the transitional terms "comprising," "consisting essentially of" and "consisting of."

I claim:

1. Electrochromic spectacles comprising:
   a. a lens frame;
   b. an electrochromic lens attached to the lens frame comprising a first electrode and a second electrode, wherein the electrochromic lens is configured to switch between a light state and a dark state when an electrical potential is applied to the first and second electrodes;
   c. a photosensor attached to the lens frame and positioned behind the electrochromic lens to measure a light level behind the electrochromic lens at an eye of a wearer of the electrochromic spectacles and produce a photosensor potential based on the light level behind the electrochromic lens at the eye of the wearer of the electrochromic spectacles; and
   d. a controller in electrical communication with the electrochromic lens and the photosensor and configured to receive the photosensor potential from the photosensor and deliver the electrical potential to the first and second electrodes in response to the received photosensor potential, wherein the electrical potential comprises a continuous potential that includes a series of overpotential pulses comprising a pulse sequence of overpotential pulses and operating potential pulses, wherein the overpotential pulses each have a length of less than 0.5 seconds, wherein each overpotential pulse is greater in magnitude than the operating potential; and wherein the controller is configured to halt the delivery of the continuous potential once a selected transmittance state of the electrochromic lens is reached.

2. The electrochromic spectacles of claim 1, comprising a power source in electrical communication with the controller.

3. The electrochromic spectacles of claim 2, wherein the power source comprises a battery.

4. The electrochromic spectacles of claim 2, wherein the power source comprises a charging port.

5. The electrochromic spectacles of claim 1, wherein the electrochromic lens comprises a conductive transparent substrate that comprises indium-tin-oxide (ITO), glass, poly (ethylene terephthalate) (PET), tin-oxide, gold, carbon-nanotubes, or a combination thereof.

6. The electrochromic spectacles of claim 1, wherein the electrochromic lens comprises polymeric materials, metal oxides, liquid crystals, or a combination thereof.

7. The electrochromic spectacles of claim 1, wherein the photosensor is configured to receive light at wavelengths selected from the group consisting of ultraviolet (UV) wavelengths, visible (vis) wavelengths, near-infrared (NIR) wavelengths, microwave (μwave) wavelengths, and a combination thereof.

* * * * *